US011948186B1

(12) United States Patent
Eraker et al.

(10) Patent No.: US 11,948,186 B1
(45) Date of Patent: *Apr. 2, 2024

(54) USER INTERFACE FOR IMAGE-BASED RENDERING OF VIRTUAL TOURS

(71) Applicant: Appliance Computing III, Inc., Seattle, WA (US)

(72) Inventors: David Eraker, Waldron, WA (US); Aravind Kalaiah, San Jose, CA (US); Robert McGarty, Seattle, WA (US)

(73) Assignee: Appliance Computing III, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,563

(22) Filed: Feb. 18, 2023

Related U.S. Application Data

(63) Continuation of application No. 16/744,169, filed on Jan. 15, 2020, now Pat. No. 11,610,256, which is a
(Continued)

(51) Int. Cl.
*G06Q 30/00* (2023.01)
*G06F 3/04815* (2022.01)
(Continued)

(52) U.S. Cl.
CPC ..... *G06Q 30/0643* (2013.01); *G06F 3/04815* (2013.01); *G06F 3/04842* (2013.01);
(Continued)

(58) Field of Classification Search
CPC ............... G06Q 30/0643; G06Q 50/16; G06Q 30/0623; G06T 19/003; G06T 11/60;
(Continued)

(56) References Cited

U.S. PATENT DOCUMENTS 6,760,026 B2    7/2004   Li et al.
6,903,738 B2    6/2005   Pfister et al.
(Continued)

FOREIGN PATENT DOCUMENTS

CA    2587644    1/2015
CN    1242851    1/2000
(Continued)

OTHER PUBLICATIONS

U.S. Appl. No. 61/502,427, filed Jun. 29, 2011, Bell et al.
(Continued)

*Primary Examiner* — Anand Loharikar
(74) *Attorney, Agent, or Firm* — Lowe Graham Jones PLLC; Ellen M. Bierman

(57) ABSTRACT

Under an embodiment of the invention, a computer system includes a user interface (UI) for virtual tours of modeled real estate. The UI includes three ways to navigate the modeled real estate. The first navigation element is a 3D UI element that provides a 3D view of the property and enables the user to freely navigate in the XY plane of the virtual model. The second navigation element is a 2D map of the real property overlaid on a portion of the 3D UI element. The 2D map overlay enables navigation in the XY plane of the virtual model. The third navigation element is a 1D text element of the real property overlaid on a portion of the 3D UI element. The 1D text overlay enables navigation along the Z axis or the XY plane of the virtual model.

23 Claims, 12 Drawing Sheets

Related U.S. Application Data continuation of application No. 16/363,807, filed on Mar. 25, 2019, now abandoned, which is a continuation of application No. 14/525,052, filed on Oct. 27, 2014, now Pat. No. 10,242,400.

(60) Provisional application No. 61/895,978, filed on Oct. 25, 2013.

(51) Int. Cl.
| | |
|---|---|
| *G06F 3/04842* | (2022.01) |
| *G06F 16/951* | (2019.01) |
| *G06Q 30/0601* | (2023.01) |
| *G06Q 50/16* | (2012.01) |
| *G06T 11/60* | (2006.01) |
| *G06T 17/00* | (2006.01) |
| *G06T 19/00* | (2011.01) |
| *G09G 5/14* | (2006.01) |

(52) U.S. Cl.
CPC ....... *G06F 16/951* (2019.01); *G06Q 30/0623* (2013.01); *G06Q 50/16* (2013.01); *G06T 11/60* (2013.01); *G06T 17/00* (2013.01); *G06T 19/003* (2013.01); *G09G 5/14* (2013.01); *G06T 2210/04* (2013.01); *G06T 2219/028* (2013.01); *G09G 2340/12* (2013.01)

(58) Field of Classification Search
CPC ................ G06T 17/00; G06T 2210/04; G06T 2219/028; G06F 16/951; G06F 3/04815; G06F 3/04842; G09G 5/14; G09G 2340/12
USPC .............................................. 705/26.1–27.2
See application file for complete search history.

(56) References Cited

U.S. PATENT DOCUMENTS

| | | | |
|---|---|---|---|
| 6,968,973 | B2 | 11/2005 | Uyttendaele et al. |
| 7,126,603 | B2 | 10/2006 | Aliaga et al. |
| 7,463,280 | B2 | 12/2008 | Steuart, III |
| 7,570,261 | B1 | 8/2009 | Edecker et al. |
| 7,834,883 | B2 | 11/2010 | Adams |
| 8,140,421 | B1 | 3/2012 | Humphries et al. |
| 8,207,964 | B1 | 6/2012 | Meadow et al. |
| 8,213,916 | B1* | 7/2012 | Yankovich ....... H04N 21/44008 455/414.3 |
| 8,339,394 | B1 | 12/2012 | Lininger |
| 8,346,017 | B2 | 1/2013 | Aguera et al. |
| 8,635,104 | B2 | 1/2014 | Adams |
| 8,681,151 | B2 | 3/2014 | Coombe et al. |
| 8,861,840 | B2 | 10/2014 | Bell et al. |
| 8,861,841 | B2 | 10/2014 | Bell et al. |
| 8,879,828 | B2 | 11/2014 | Bell et al. |
| 8,890,863 | B1 | 11/2014 | Lininger |
| 9,013,505 | B1 | 4/2015 | Thornton |
| 9,025,861 | B2 | 5/2015 | Furukawa et al. |
| 9,087,401 | B1 | 7/2015 | Zheng et al. |
| 9,098,908 | B2 | 8/2015 | Kirk et al. |
| 9,165,410 | B1 | 10/2015 | Bell et al. |
| 9,171,405 | B1 | 10/2015 | Bell et al. |
| 9,324,190 | B2 | 4/2016 | Bell et al. |
| 9,361,943 | B2 | 6/2016 | Thrun |
| 9,396,586 | B2 | 7/2016 | Bell et al. |
| 9,489,775 | B1 | 11/2016 | Bell et al. |
| 9,786,097 | B2 | 10/2017 | Bell et al. |
| 9,836,885 | B1 | 12/2017 | Eraker et al. |
| 9,888,215 | B2 | 2/2018 | Sankar et al. |
| 9,953,111 | B2 | 4/2018 | Bell et al. |
| 10,055,876 | B2 | 8/2018 | Ford et al. |
| 10,102,673 | B2 | 10/2018 | Eraker et al. |
| 10,127,722 | B2 | 11/2018 | Shakib et al. |
| 10,139,985 | B2 | 11/2018 | Mildrew et al. |
| 10,510,111 | B2 | 12/2019 | Eraker et al. |
| 10,592,973 | B1 | 3/2020 | Eraker et al. |
| 11,062,384 | B1 | 7/2021 | Eraker et al. |
| 11,449,926 | B1 | 9/2022 | Eraker et al. |
| 2002/0054129 | A1 | 5/2002 | Heron et al. |
| 2002/0065739 | A1 | 5/2002 | Florance et al. |
| 2002/0087389 | A1 | 7/2002 | Sklarz et al. |
| 2002/0113791 | A1 | 8/2002 | Li et al. |
| 2003/0083957 | A1 | 5/2003 | Olefson |
| 2004/0012602 | A1 | 1/2004 | Mech |
| 2004/0019517 | A1 | 1/2004 | Sennott |
| 2004/0240741 | A1 | 12/2004 | Aliaga et al. |
| 2006/0085234 | A1 | 4/2006 | Cagan |
| 2006/0105342 | A1 | 5/2006 | Villena et al. |
| 2006/0218003 | A1 | 9/2006 | Snyder |
| 2006/0218005 | A1 | 9/2006 | Villena et al. |
| 2007/0127823 | A1 | 6/2007 | Seeber |
| 2007/0198278 | A1 | 8/2007 | Cheng et al. |
| 2008/0106593 | A1 | 5/2008 | Arfvidsson et al. |
| 2009/0031246 | A1* | 1/2009 | Cowtan ................. G06Q 30/00 715/854 |
| 2009/0189983 | A1 | 7/2009 | Brumfield et al. |
| 2010/0214284 | A1 | 8/2010 | Rieffel et al. |
| 2010/0251101 | A1 | 9/2010 | Haussecker et al. |
| 2011/0276499 | A1 | 11/2011 | Walsh et al. |
| 2011/0279445 | A1 | 11/2011 | Murphy et al. |
| 2011/0279453 | A1 | 11/2011 | Murphy et al. |
| 2012/0179983 | A1 | 7/2012 | Lemire |
| 2012/0194516 | A1 | 8/2012 | Newcombe et al. |
| 2012/0278465 | A1 | 11/2012 | Johnson |
| 2013/0016033 | A1 | 1/2013 | Latta et al. |
| 2013/0073388 | A1 | 3/2013 | Heath |
| 2013/0095920 | A1 | 4/2013 | Patiejunas et al. |
| 2013/0174059 | A1 | 7/2013 | Van Wie et al. |
| 2013/0205257 | A1 | 8/2013 | Albright |
| 2013/0208113 | A1 | 8/2013 | Yoneji |
| 2013/0222369 | A1 | 8/2013 | Huston et al. |
| 2013/0321396 | A1 | 12/2013 | Kirk et al. |
| 2013/0321575 | A1 | 12/2013 | Kirk et al. |
| 2013/0321586 | A1 | 12/2013 | Kirk et al. |
| 2013/0321589 | A1 | 12/2013 | Kirk et al. |
| 2013/0321593 | A1 | 12/2013 | Kirk et al. |
| 2014/0053077 | A1 | 2/2014 | Unnikrishnan et al. |
| 2014/0092281 | A1 | 4/2014 | Nisenzon et al. |
| 2014/0125658 | A1 | 5/2014 | Bell et al. |
| 2014/0125767 | A1 | 5/2014 | Bell et al. |
| 2014/0125768 | A1 | 5/2014 | Bell et al. |
| 2014/0125769 | A1 | 5/2014 | Bell et al. |
| 2014/0125770 | A1 | 5/2014 | Bell et al. |
| 2014/0198127 | A1 | 7/2014 | Ying |
| 2014/0285486 | A1 | 9/2014 | Chang et al. |
| 2014/0301645 | A1 | 10/2014 | Mattila |
| 2015/0186953 | A1 | 7/2015 | Gross |
| 2015/0268043 | A1 | 9/2015 | McFadden et al. |
| 2016/0255357 | A1 | 9/2016 | Sun et al. |
| 2017/0069142 | A1 | 3/2017 | Elmekies |

FOREIGN PATENT DOCUMENTS

| | | |
|---|---|---|
| JP | 11-259672 | 9/1999 |
| JP | 2004-265396 | 9/2004 |

OTHER PUBLICATIONS

U.S. Appl. No. 61/603,221, filed Feb. 24, 2012, Bell et al.
U.S. Appl. No. 61/663,265, filed Jun. 22, 2012, Bell.
Buehler, C. et al., "Unstructured Lumigraph Rendering," SIGGRAPH '01, Proceedings of the 28th annual conference an Computer graphics and interactive techniques, Aug. 2001, pp. 425-432, https://doi.org/10.1145/383259.383309, retrieved through ACM Digital Library on May 5, 2021, 12 pages.
Debevec, P., "Image-Based Lighting," USC Institute for Creative Technologies, Tutorial, IEEE Computer Graphics and Applications, Mar./Apr. 2002, pp. 26-34.
Gortler, S. et al., "The Lumigraph," SIGGRAPH '96, Proceedings of the 23$^{rd}$ annual conference on Computer graphics and interactive techniques, Aug. 1996, pp. 43-54, https://doi.org/10.1145/237170.

(56) References Cited

OTHER PUBLICATIONS 237200, retrieved through ACM Digital Library on May 5, 2021, 18 pages.
Levoy et al., "Light Field Rendering," Computer Science Department, Stanford University, ACM-0-89791-746-4/96/008, 1996, 12 pages.
"Competition and Real Estate," The United States Department of Justice, updated Jan. 12, 2016, retrieved from the Internet at http://www.justice.gov/atr/public/real_estate/, on Aug. 22, 2019, 2 pages.
"Enforcing Antitrust Laws in the Real Estate Industry," The United States Department of Justice, updated Jul. 2, 2015, retrieved from the Internet at http://www.justice.gov/atr/public/real_estate/enforce. html, on Aug. 22, 2019, 2 pages.
"Google Street View gets peek inside Sheffield university buildings," article amended on Apr. 5, 2013, retrieved from the Internet through theguardian.com on Aug. 2, 2019, 3 pages.
"How Redfin Helped Optimize Matterport Technology for Real Estate," Matterport, retrieved from the Internet through matterport. com, on Aug. 22, 2019, 2 pages.
"Improving Competition in Real Estate Transactions," Policy Roundtables, Competition Law & Policy, OECD, 2007, retrieved from the Internet at http://www.oecd.org/regreform/sectors/39748266.pdf, on Aug. 22, 2019, 245 pages.
Kang, Sing Bing et al., "Virtual Navigation of Complex Scenes using Clusters of Cylindrical Panoramic Images," Cambridge Research Laboratory, Technical Report Series, Sep. 1997, CRL May 97, 31 pages.
"Laser Scanner for Fast and Exact Indoor and Outdoor Measurements in Three Dimensions: Simply at Your Fingertips," Focus Laser Scanner Series, FARO, retrieved from the Internet at http://www.faro.com/en-us/products/3d-surveying/faro-focus3d/overview, on Aug. 22, 2019, 4 pages.
"Machine Vision—Area Scan Cameras," FLIR Systems, Inc., retrieved from the Internet at http://ww2.ptgrey.com/products/ladybug5/, on Aug. 22, 2019, 2 pages.
"Matterport Raises $16 Million in Series B Financing to Lead 3D Expansion," Matterport Press Release, Jul. 2014, Mountain View, CA, retrieved from the Internet through matterport.com, on Aug. 2, 2019, 4 pages.
"Quick Real Estate Statistics," National Association of Realtors, May 11, 2018, retrieved from the Internet at http://www.realtor.org/field-guides/field-guide-to-quick-real-estate-statistics, on Aug. 22, 2019, 5 pages.
"The great realtor rip-off," The Economist, May 5, 2012, retrieved from the Internet at http://www.economist.com/node/21554204, on Aug. 22, 2019, 2 pages.
Baker, Natasha, "New apps help shoppers identify items using image recognition," Reuters, 2013, retrieved from the Internet at https://www.reuters.com/article/us-apps-pounce/new-apps-help-shoppers-identify-items-using-image-recognition-idUSBRE97P06J20130826, on Aug. 22, 2019, 5 pages.
Bernheim, B. Douglas et al., "Do Real Estate Brokers Add Value When Listing Services Are Unbundled," NBER Working Paper Series, Working Paper 13796, National Bureau of Economic Research, Cambridge, MA, Feb. 2008, retrieved from the Internet at http://www.nber.org/papers/w13796.pdf?new_window=1, on Aug. 22, 2019, 32 pages.
Debevec, Paul et al. "Efficient View-Dependent Image-Based Rendering With Projective Texture-Mapping," G. Drettakis et al. (eds.), Rendering Techniques' 98, Springer-Verlag Wien, Vienna, 1998, 13 pages.

Elfelt, Joseph, "#1—Google maps now shows property parcel lines for many areas," Blog entry, www.MappingSupport.com, Redmond, Washington, Oct. 19, 2009, available at https://activerain.com/droplet/yfz, 10 pages.
Garmin Oregon 450t Handheld GPS Navigator, by Garmin, retrieved from the Internet at http://www.amazon.com/Garmin-Oregon-450t-Handheld-Navigator/dp/B00313JX56/ref=sr_1_12?s=gps&ie=UTF8&aid=1380814616&sr=1-12, on Aug. 22, 2019, 6 pages.
He, Li-Wei et al., "Rendering with Concentric Mosaics," Microsoft, Association for Computing Machinery, Inc., Jan. 1999, 8 pages.
Levitt et al., "Antitrust Implications of Outcomes When Home Sellers Use Flat-Fee Real Estate Agents," Project Muse, Brookings-Wharton Papers on Urban Affairs, 2008, pp. 47-93, retrieved from the Internet at http://muse.jhu.edu/journals/brookings-wharton_papers_on_urban_affairs/v2008/2008.levitt.pdf, on Aug. 22, 2019.
Peck, Emily, "In Real Estate, A Picture Is Worth $1,000 or More," The Wall Street Journal, Oct. 4, 2010, retrieved from the Internet at http://blogs.wsj.com/developments/2010/10/04/in-real-estate-a-picture-is-worth-1000-or-more/, on Aug. 22, 2019, 2 pages.
Sankar et al. "Capturing Indoor Scenes with Smartphones," UIST'12, Oct. 7-10, 2012, Cambridge, Massachusetts, 9 pages.
Schwab, Klaus (ed.), "The Global Competitiveness Report 2011-2012," World Economic Forum, Geneva, Switzerland, 2011, retrieved from the Internet at http://www3.weforum.org/docs/WEF_GCR_Report_2011-12.pdf, on Aug. 22, 2019, 544 pages.
Shum, Heung-Yeung et al., "A Review of Image-based Rendering Techniques," Microsoft, In Visual Communications and Image Processing 2000, Ngan, King N et al. (eds.), Proceedings of SPIE, vol. 4067, 2000, 12 pages.
"Stanley 77-018 IntelliMeasure® Distance Estimator" fact sheet, Item No. WBB983318, globalindustrial.com, retrieved from the Internet at http://www.globalindustrial.com/p/tools/test-measurement/Gauge-Block-Ball-Sets/77-018-intellimeasure-distance-estimator?infoParam.campaignId=T9A&gclid=CNyrut3_-rkCFRDZOgodgRMAxw, on Aug. 22, 2019, 2 pages.
Szeliski, Richard, "Computer Vision: Algorithms and Applications," Draft, Springer, Sep. 3, 2010, Chapter 13, "Image-based rendering," pp. 619-654.
Szeliski, Richard, "Computer Vision: Algorithms and Applications," Draft, Springer, Sep. 3, 2010, Chapter 14, "Recognition," pp. 655-729.
Uyttendaele, Matthew et al., "High-quality Image-based Interactive Exploration of Real-World Environments," Technical Report, MSR-TR-2003-61, Microsoft Corporation, Redmond, Washington, Oct. 2003, 34 pages.
Videos of Photosynth (printout of page where located), retrieved on the Internet at http://photosynth.net/view.aspx?cid=241d5bf8-d92f-49f8-b94b-8d5fea6e1a2c on Aug. 22, 2019, 2 pages.
Zhang, Cha et al., "A Survey on Image-Based Rendering—Representation, Sampling and Compression," Technical Report AMP 03-03, Electrical & Computer Engineering, Carnegie Mellon University, Pittsburgh, Pennsylvania, Jun. 2003, 45 pages.
Du et al., "Interactive 3D Modeling of Indoor Environments with a Consumer Depth Camera," ACM, 2011, all pages.
"Home Improvement—Improve the shopping experience with 3D visualization," Matterport retrieved from the Internet through https://web.archive.org/web/20131014092337/http:/matterport.com/industries/, on Aug. 22, 2019.
Shenchang, Eric Chen, "QuickTime® VR—An Image-Based Approach to Virtual Environment Navigation," Apple Computer, Inc., Aug. 1995, 10 pages.
Triggs, B. et al. (Eds.), "Bundle Adjustment—A Modem Synthesis," Vision algorithms : theory and practice : International Workshop on Vision Algorithms, Corfu, Greece, Sep. 21-22, 1999, LNCS 1883, pp. 298-372, 2000.

\* cited by examiner

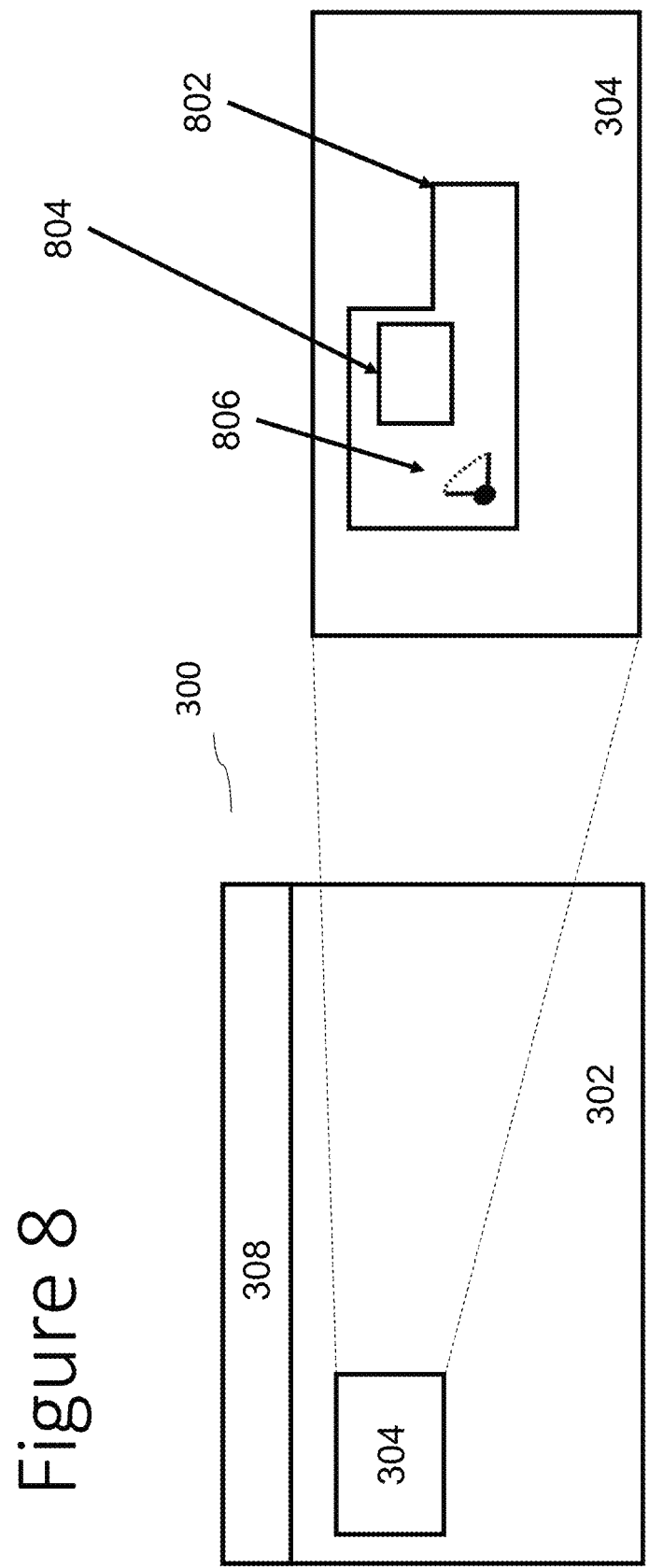

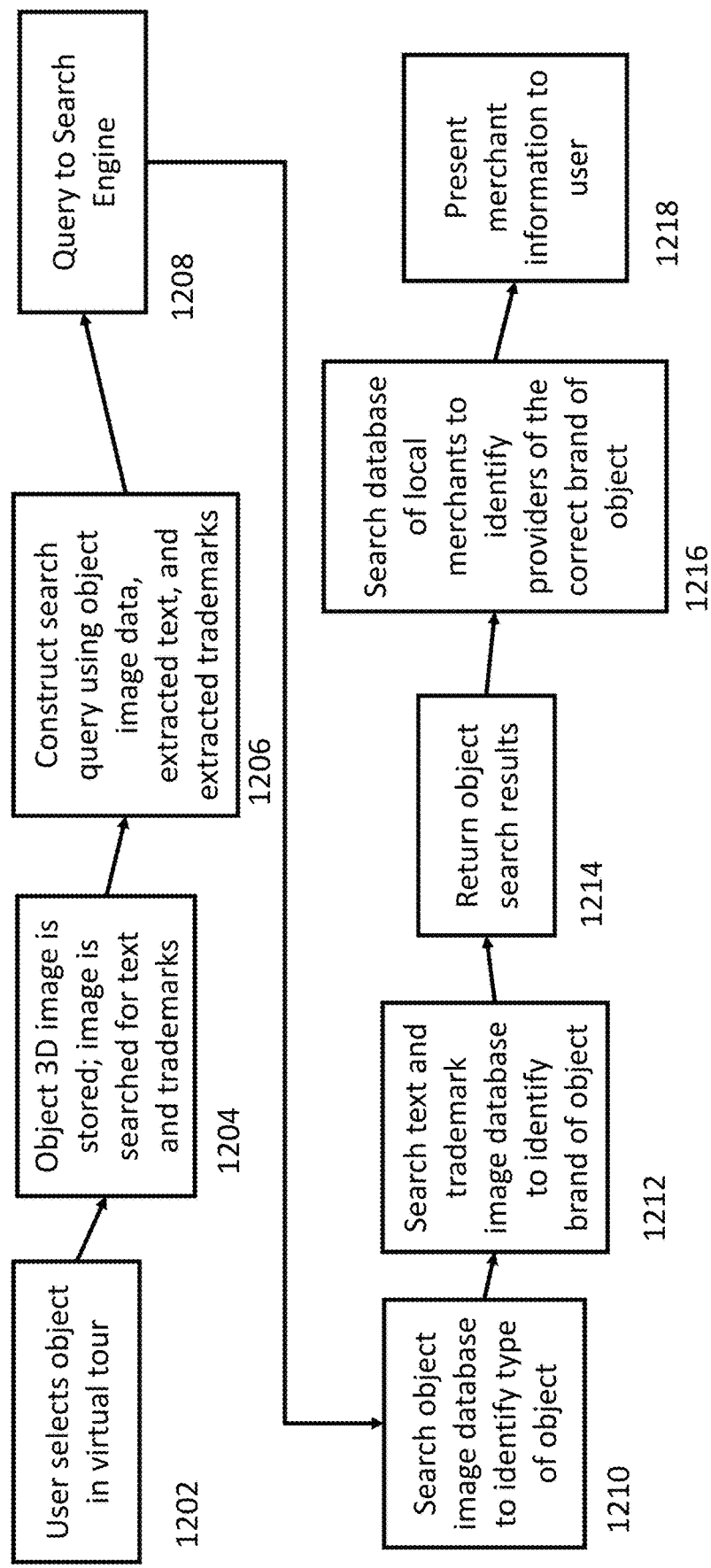

USER INTERFACE FOR IMAGE-BASED RENDERING OF VIRTUAL TOURS

This application is a continuation of U.S. patent application Ser. No. 16/744,169 titled "USER INTERFACE FOR IMAGE-BASED RENDERING OF VIRTUAL TOURS," filed Jan. 15, 2020, which application is a continuation of U.S. patent application Ser. No. 16/363,807, filed Mar. 25, 2019; which is a continuation of U.S. patent application Ser. No. 14/525,052, filed Oct. 27, 2014, now U.S. Pat. No. 10,242,400, issued Mar. 26, 2019; which claims the benefit of U.S. Provisional Patent Application No. 61/895,978, filed Oct. 25, 2013. This application is related to U.S. patent application Ser. No. 14/525,057, filed Oct. 27, 2014, entitled "IMAGE-BASED RENDERING OF REAL SPACES", U.S. patent application Ser. No. 14/525,059, filed Oct. 27, 2014, entitled "IMAGE-BASED RENDERING OF VIRTUAL MODELS OF REAL SPACES", and U.S. patent application Ser. No. 14/525,060, filed Oct. 27, 2014, entitled "MAGE-BASED RENDERING OF THREE DIMENSION GEOMETRIES", all commonly assigned. The above U.S. patent applications are fully incorporated herein by reference in their entireties.

TECHNICAL FIELD

This disclosure relates generally to methods and systems for image-based rendering, such as user interfaces for image-based rendering of virtual tours of real spaces.

BACKGROUND

The typical user interface for virtual real estate tours is characterized by numerous inefficiencies that create navigation problems for users.

Potential home buyers suffer from a lack of real estate information and tools. The websites of many real estate brokerages generally provide some photographs of the properties in their listings. However, these websites remain surprisingly poor at providing comprehensive visual information about properties.

From the buyer's perspective, real estate websites suffer from numerous problems at present. First among these is the typical gallery of photographs of the property. Usually, the photographs are taken by the real estate agent or homeowner and are intended to highlight the positive attributes of the property while minimizing any negative attributes. Second, the photo galleries are usually navigated linearly, by proceeding from one two-dimensional photograph to the next. Lastly, the viewer must usually guess at which location within the property the photo is taken (for example, a photo of a master bedroom might leave the viewer guessing as to whether the master bedroom is in the front or back of the house, on the first floor or second floor, etc.).

There is a need for a system that overcomes limitations of the current user interface of real estate web sites, as well as providing additional benefits.

SUMMARY

A brief summary of some embodiments and aspects of the invention are first presented. Some simplifications and omissions may be made in the following summary; the summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the Figures, and from the claims (which follow the detailed description).

Under an embodiment of the invention, a web site system maintains a real estate web page. The real estate web page facilitates three-dimensional (3D) image-based rendering virtual tours of real properties through a unique user interface that provides multiple viewpoints and tour navigation tools. The web site system facilitates virtual tours of real estate, such as homes, that are offered for sale via the web site system. The web site system can store various information about properties in which the user is interested and facilitate sharing of information with a real estate agent or other service provider (e.g., a local merchant).

One embodiment of the disclosed invention includes a method, embodied in a computer system, of providing virtual tours of real property. The method includes the steps of maintaining a web site system that facilitates selection of a real property from a database of real properties; receiving from a user a first selection, the first selection indicating a real property which the user would like to virtually tour; receiving from the user a request to initiate a virtual real estate tour; displaying a 3D viewpoint within a virtual model of the real property; displaying a 2D map overlay of the real property on a first portion of the user interface; and displaying a 1D text overlay of the real property on a second portion of the user interface.

One embodiment of the disclosed invention is a system for providing image-based rendering of real property. The system including a server computer for maintaining a website system, the server operatively connected to a database of real properties; the website system facilitating selection of a real property from the database of real properties; and a user interface, operatively connected to the website system and the server computer. The system receiving a first selection from a user, the first selection indicating a real property which the user would like to virtually tour; receiving a second selection from the user, the second selection initiating a virtual real estate tour; displaying a 3D viewpoint within a virtual model of the real property; displaying a 2D map overlay of the real property on a portion of the user interface; and displaying a 1D text overlay of the real property on a portion of the user interface.

One embodiment of the disclosed invention includes a non-transitory computer readable medium containing a program adapted to implement a method including the steps of presenting a webpage to a user; receiving, via the webpage, a first selection from the user, the first selection indicating a real property which the user would like to virtually tour; receiving from the user a request to initiate a virtual real estate tour; displaying a 3D UI element within a virtual model of the real property, the 3D UI element enabling navigation in the XY plane of the virtual model; displaying a 2D map overlay of the real property on a portion of the 3D UI element, the 2D map overlay enabling navigation in the XY plane of the virtual model; and displaying a 1D text overlay of the real property on a portion of the 3D UI element, the 1D text overlay enabling navigation along the Z axis or the XY plane of the virtual model.

BRIEF DESCRIPTION OF THE DRAWINGS

FIG. 8 shows a block diagram of a virtual tour user interface according to one embodiment of the invention.

FIG. 12 shows a flowchart of an embodiment of a method of providing information about virtual tour property suitable for use with the disclosed inventions.

Figure 1:
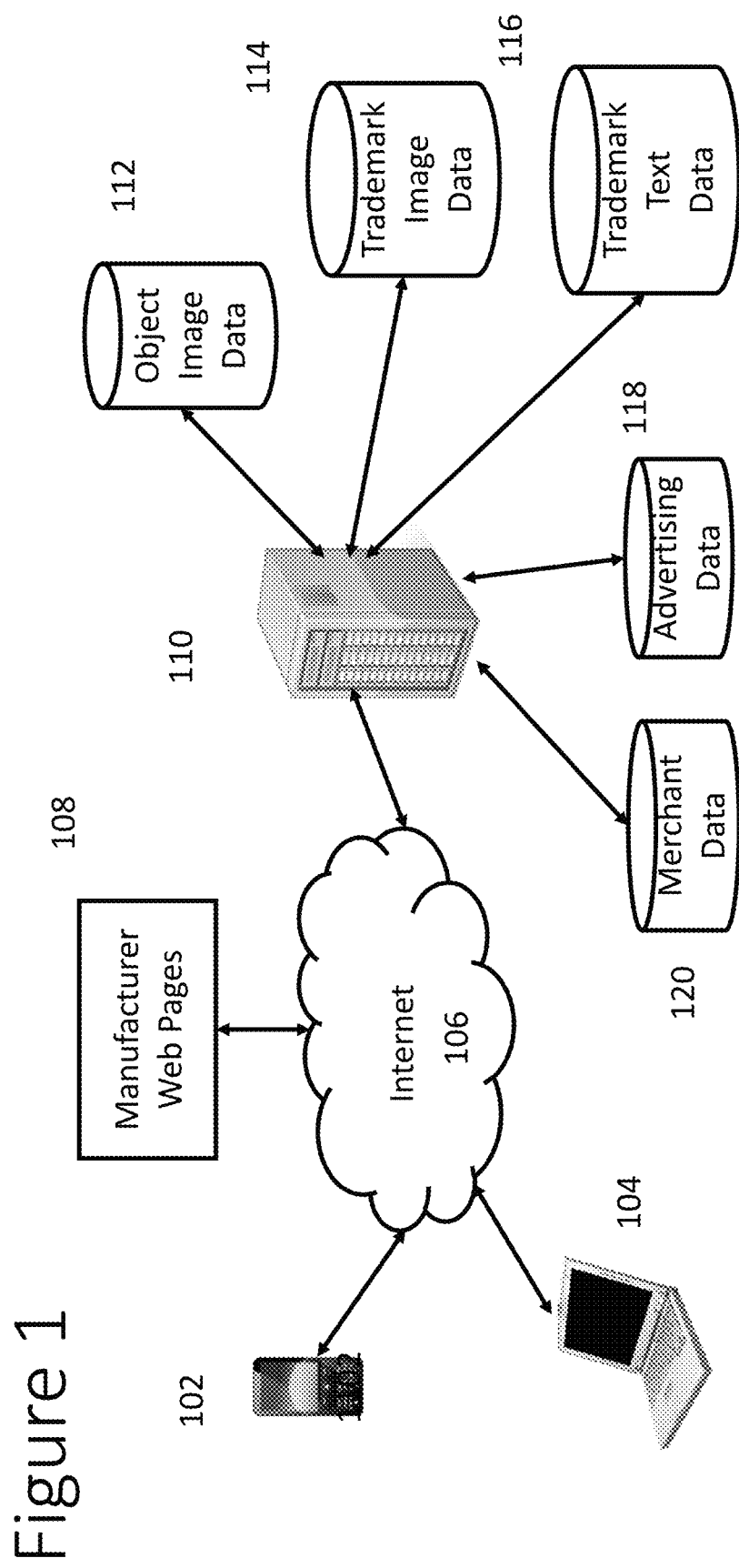
FIG. 1 shows a block diagram of a personal property merchandising and advertising system suitable for use with the disclosed inventions.

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number generally refers to the Figure number in which that element is first introduced (e.g., element 102 is first introduced and discussed with respect to FIG. 1).

DETAILED DESCRIPTION

The following description provides specific details for a thorough understanding of, and enabling description for, these embodiments of the invention. However, a person of ordinary skill in the art will understand that the invention may be practiced with many variations and these details do not list every possible variation. In some instances, well known structures and functions have not been shown or described in detail to avoid unnecessarily obscuring the description of the embodiments of the invention.

OVERVIEW

In some embodiments of the invention, a web site implemented in a computer system allows users to navigate a virtual tour of a real property. Among its many uses described herein, embodiments of the web site system provide a capability to tour a real property without physically visiting the property, to store and share portions of virtual tours, and to search for objects to purchase from merchants. In some embodiments, the system displays information on the web page but other delivery methods can be used, such as streaming video or email.

Embodiments of the invention include numerous innovative informational, analytical, and collaborative tools. Geometry and image data are combined to create photorealistic synthetic views using different IBR approaches, based on the density of the data and geometry. The system may deliver the data by client-server over the Internet. Photorealism may be maintained within panoramas at image capture locations, which are the primitives in some embodiments of the system.

Some embodiments of the user interface provide valuable data that is aggregated from system user trends. Thus property sellers can see how many system users have viewed their virtual property, what areas of the virtual tour were most interesting to the viewers, and so on. On an individual level, this "backend" data can also be used for targeted advertising. For example, if a visitor to the virtual property is viewing the kitchen, the web site system might show an advertisement for an appliance store from which the refrigerator in the virtual kitchen may be purchased. Similarly, the system might show an advertisement for a furniture store that specializes in furniture in a style similar to that in which the virtual property is decorated.

In some embodiments, the system includes mechanisms for collaboration between various users of the system. Shared access to select user account information and a messaging system allow users to share their "favorites" folder with their real estate agents, leave comments and questions for home sellers, receive "suggested" property tours in the users "suggested" folder, and append comments or notes that will be visible to the user. In various embodiments, the messaging system may contain user accounts having instant messaging, email, and folders for storing and sharing favorites using any of well-known techniques for implementing those features.

Example Computing Environment for Providing User Interfaces for Image-Based Rendering FIG. 1 shows a block diagram of an exemplary embodiment of a computing environment providing the systems and methods described herein. A user may access a virtual tour user interface over the Internet 106 via a webpage or streamed media hosted on a remote server 110. Alternatively, the UI may be hosted locally on smartphone 102 or mobile computer 104, either as a standalone application or cached media. When the user selects an object shown in virtual tour, a search engine, which may be hosted on the server computer 110, will query the 3D object image database 112 to identify the object by matching its 3D image. Image and text recognition software will extract any trademark or text (e.g., manufacturer name) from the object's 3D image. The search engine will query the trademark image database 114 and/or the trademark text database 116, depending on whether trademark text or image were successfully extracted from the object image. After the object has been identified, the server computer 110 will query advertising database 18 and merchant database 120 to identify relevant advertisements and merchants that sell the object. In the embodiment shown, the server computer 110 will then provide the product, merchant, and advertising information to the user via the user interface. Although the product and merchant identification process has primarily been discussed in the context of an on-demand system without metadata or product tags associated with objects in the virtual tour, it is important to note that alternative embodiments may use such metadata to identify products rather than relying on image matching and trademark searching. For example, the product tag associated with the chair in UI element 1110 of FIG. 11 could indicate that product and merchant information about the chair have been preloaded into the virtual tour data.

Figure 2:
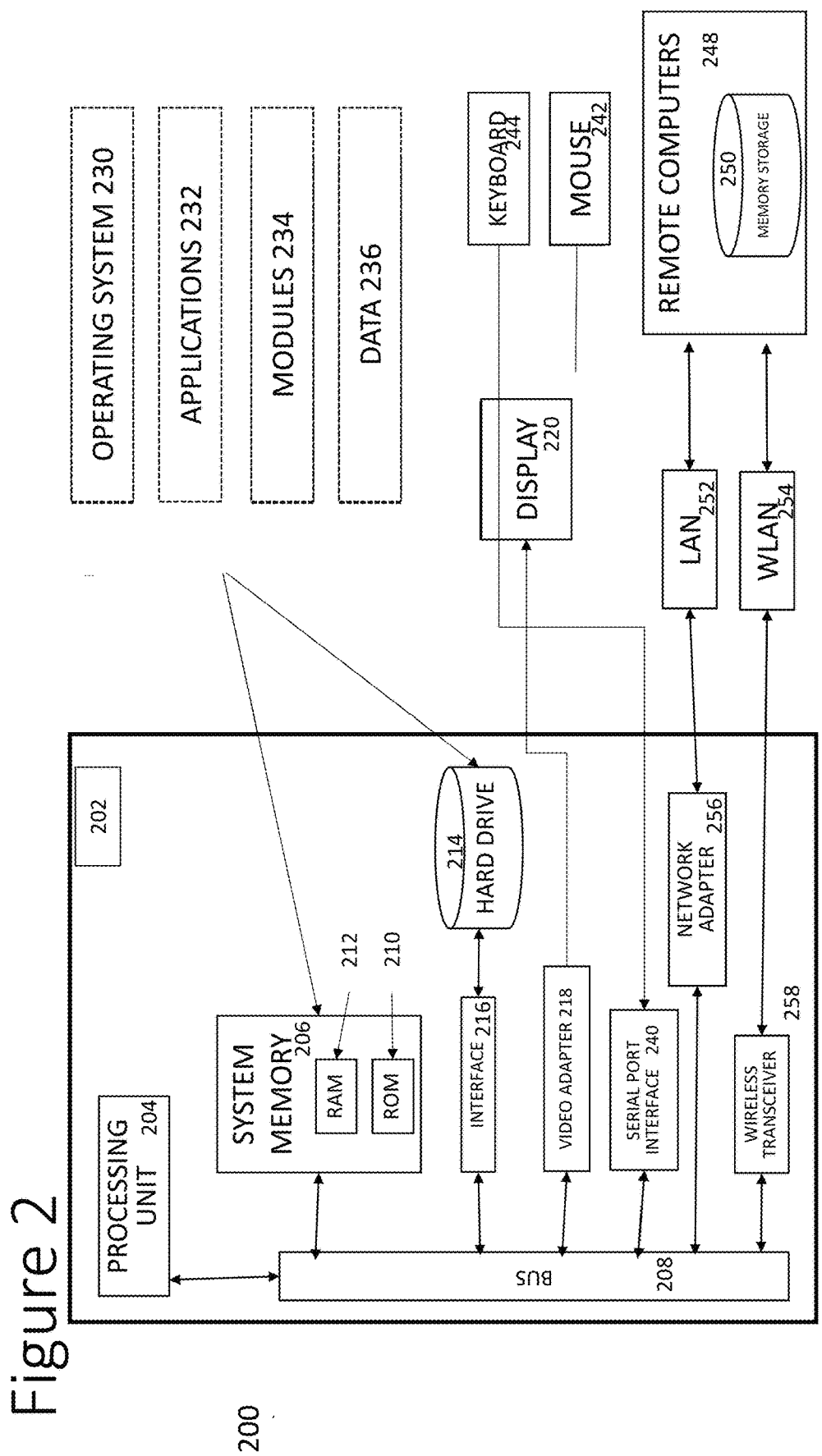
FIG. 2 shows a block diagram of an embodiment of a computer system suitable for use with the disclosed inventions.

FIG. 2 and the following discussion are intended to provide a brief, general description of a suitable computing environment 200 in which various aspects of the disclosed invention may be implemented. Those skilled in the art will recognize that the invention also may be implemented as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. Aspects of the disclosed inventions may also be practiced in distributed computing environments where certain tasks are performed by remote processing devices that are linked through a communications network. In a distributed computing environment, program modules may be located in both local and remote memory storage devices.

FIG. 2 shows an exemplary environment 200 for implementing various aspects of the disclosed inventions that includes a computer 202, the computer 202 including a processing unit 204, a system memory 206 and a system bus 208. The system bus 208 couples system components including, but not limited to, the system memory 206 to the processing unit 204. The processing unit 204 may be any of various commercially available processors. Dual microprocessors and other multi-processor architectures may also be employed as the processing unit 204.

The system bus 208 can be any of several types of bus structure that may further interconnect to a memory bus (with or without a memory controller), a peripheral bus, and a local bus using any of a variety of commercially available bus architectures. The system memory 206 includes read only memory (ROM) 210 and random access memory (RAM) 212. A basic input/output system (BIOS) is stored in a non-volatile memory 210 such as ROM, EPROM, EEPROM. A BIOS contains the basic routines that help to transfer information between elements within the computer 202, such as during start-up.

The computer 202 further includes a hard disk drive 214. The hard disk drive 214 can be connected to the system bus 208 by a hard disk drive interface 216. The removable storage drives (DVD drives, floppy drives, etc.) are not shown for clarity. However, the removable storage drives and their associated computer-readable media provide non-volatile storage of data, data structures, and computer-executable instructions for implementing the inventions described herein. For the computer 202, the drives and media accommodate the storage of information input by a user, or received from a remote computer, in a suitable digital format. Although the description of computer-readable media above refers to a hard disk, a removable magnetic disk, and a DVD, a person of ordinary skill in the art understands that other types of storage media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

Software applications can be stored in the drives and RAM 212. These applications can include an operating system 230, one or more application programs 232, (e.g., web browsers and client applications, etc.) other program modules 234 (e.g., cookies, etc.) and program data 236. All or portions of the operating system, applications, modules, and/or data can also be cached in the RAM 212.

Embodiments of the invention can be implemented with various commercially available operating systems or combinations of operating systems.

A user can enter commands and information into the computer 202 through a keyboard 244 and a pointing device, such as a mouse 242. For example, the user might employ the mouse to navigate the virtual tour user interface. Other input devices (not shown) may include a microphone, an IR remote control, a joystick, a game pad, similar devices. These and other input devices are often connected to the processing unit 1204 through a serial port interface 240 that is coupled to the system bus 208, but may be connected by other interfaces, such as a parallel port, a game port, a universal serial bus ("USB"), an IR interface, a wireless transceiver 258, etc. A monitor 220 or other type of display device is also connected to the system bus 208 via an interface, such as a video adapter 218. In addition to the display 220, a computer typically includes other peripheral output devices (not shown), such as speakers, printers, etc., that can present information to the user.

As shown in FIG. 1, the computer 202 may operate in a networked environment using logical connections via wired and/or wireless communications to one or more remote computers, such as a remote computer(s) 248. The remote computer(s) 248 may be a workstation, a server computer, a router, a personal computer, portable computer, microprocessor-based entertainment appliance, a peer device or other common network node, and typically includes many or all of the elements described relative to the computer 202, although, for purposes of brevity, only a memory storage device 250 is illustrated. The logical connections depicted include a local area network (LAN) 252 and a wireless local area network (WLAN) 254. Such networking environments are commonplace in homes and businesses. The Internet can also be used to provide access to remote computer 248.

When used in a LAN networking environment, the computer 202 is connected to the local network 252 through a wired or wireless communication network interface or adapter 256. The adaptor 256 may facilitate wired or wireless communication to the LAN 252. When used in a WLAN networking environment, the computer 202 typically is connected to a communications server on the LAN, or has other means for establishing communications over the WLAN 254, such as the Internet. In a networked environment, program modules depicted relative to the computer 202, or portions thereof, may be stored in the remote memory storage device 250. The network connections shown are exemplary and other means of establishing a communications link between the computers may be used.

The computer 202 is operable to communicate with any other devices having wireless communication capability, e.g., a cell phone, a printer, desktop and/or portable computer, portable data assistant, and telephone. As discussed briefly above, suitable wireless technologies may include, but are not limited to, cellular, WLAN (e.g., IEEE 802.11), IEEE 802.16, IEEE 802.20, and Bluetooth.

IEEE 802.11, also commonly known as "Wifi", is a wireless communication protocol that enables computers to send and receive data anywhere within the range of a base station. A WLAN can be used to connect computers to each other, to the Internet, and to wired networks (which may use IEEE 802.3 or Ethernet communication protocols).

Aspects of the invention described above may be stored or distributed on computer-readable media, including magnetic and optically readable and removable computer discs, as well as distributed electronically over the Internet or over other networks (including wireless networks). Those skilled in the relevant art will recognize that portions or embodiments of the invention may also reside in a fixed element of a communication network such as a server or database, while corresponding portions may reside on a mobile communication device, such as a laptop computer, Personal Digital Assistant ("PDA"), or mobile phone. Data structures and transmission of data particular to aspects of the invention are also encompassed within the scope of the invention.

In accordance with the practices of persons skilled in the art of computer programming, embodiments of the invention are described with reference to acts and operations that are performed by computer systems. Such computer-executed acts and operations may be performed by an operating system (e.g., Microsoft Windows, Linux, Apple iOS, Android) or an application program. The acts and operations include the manipulation by the CPU of electrical signals representing data bits and the maintenance of data bits at memory locations to operate the computer systems and process signals. The memory locations where data bits are maintained are physical locations that have particular electrical, magnetic, or optical properties corresponding to the data bits. Although databases are shown as separate physical/logical entities for clarity, they may be combined and/or aggregated to suit the physical/logical architecture of the system in which they are used.

Figure 3:
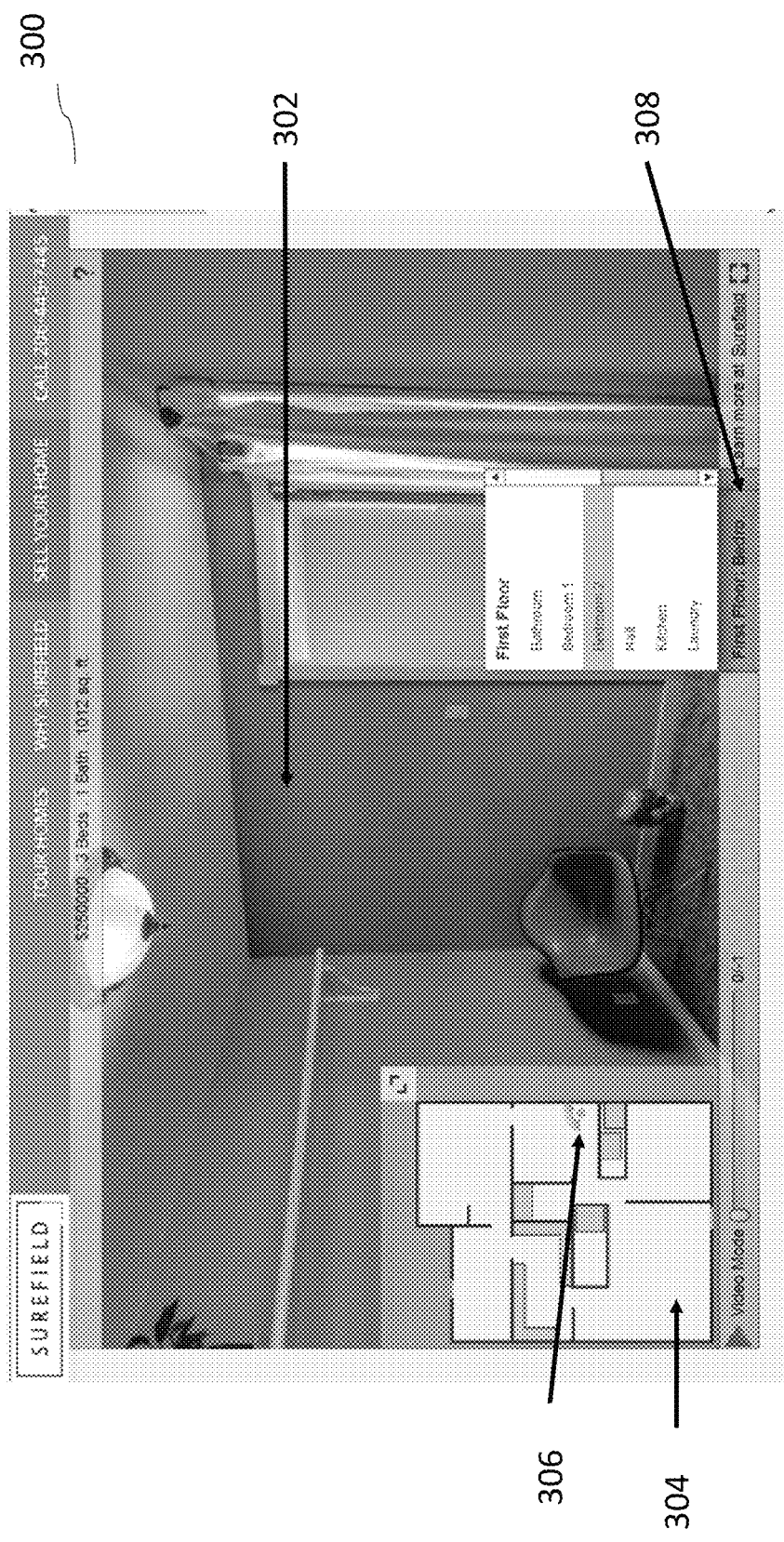
FIG. 3 shows a virtual tour user interface according to one embodiment of the invention.

Example User Interfaces for Image-Based Rendering of Virtual Tours of Real Spaces FIG. 3 shows an embodiment of a user interface 300 for navigating a three-dimensional (3D) virtual tour of a real property. Three different user interface elements serve the dual purposes of informing the user of his location in the model and simultaneously enabling spatial navigation. These three elements are shown in the user interface 300 embodiment of FIG. 3, which would normally be contained within a browser window, within a framed client application, or as the entire screen during full screen mode. User Interface element 302 is the viewpoint within a virtual model generated by combining geometry and image data using Image-Based Rendering (IBR), thus creating a 3-dimensional (3D) view. UI element 304 is a two-dimensional (2D) map overlay that displays the relative location in the virtual model of the current viewpoint 306 shown in UI element 302. UI element 308 is a text overlay that displays one or more labels associated with the user's location within the virtual model.

Figure 4:
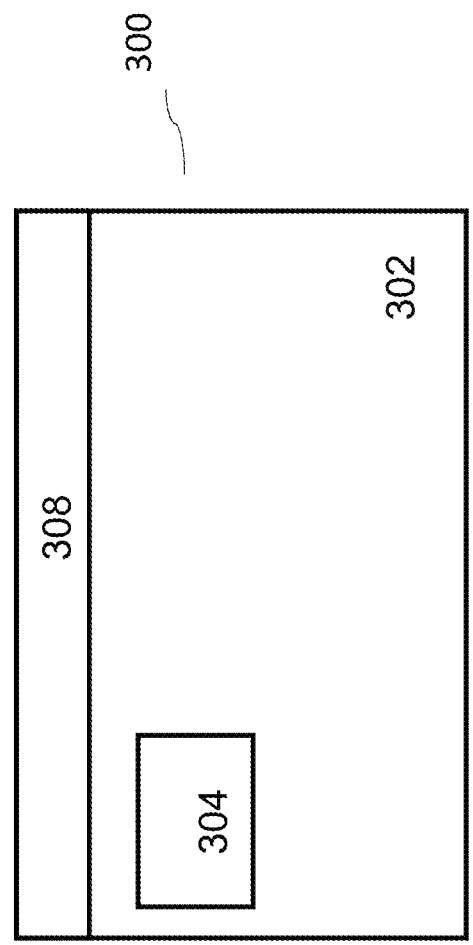
FIG. 4 shows a block diagram of a virtual tour user interface according to one embodiment of the invention.

FIG. 4 shows a block diagram of the three primary user interface elements of an embodiment of the navigation tool. UI element 302 shows a rendering of the model from a specific position and also serves as a means to navigate to adjacent positions and to change the viewing vector from a fixed position. Navigation can occur using various well known input/output (IO) devices, such as a keyboard, touchscreen, eye-tracking technology, gesture recognition technology, or a computer mouse. For densely sampled spherical panoramas, one example of navigation using UI element 302 with a mouse would be to click on the rendered view to translate in the XY plane to another panorama location in the model. Another example of navigation using UI element 302 would be to click and hold the mouse button, enabling rotation about the Z axes, thus "looking around" without translating in the XY plane. As the user navigates, the rendered viewpoint shown in UI element 302 changes in real time based on a new position and viewing vector associated with the new location.

Note that UI elements 304 and 308 are shown in different positions on the UI 300. In general, these UI elements 304 and 308 may be repositioned in any suitable configuration without affecting the underlying functionality of the overall UI 300.

Figure 5:
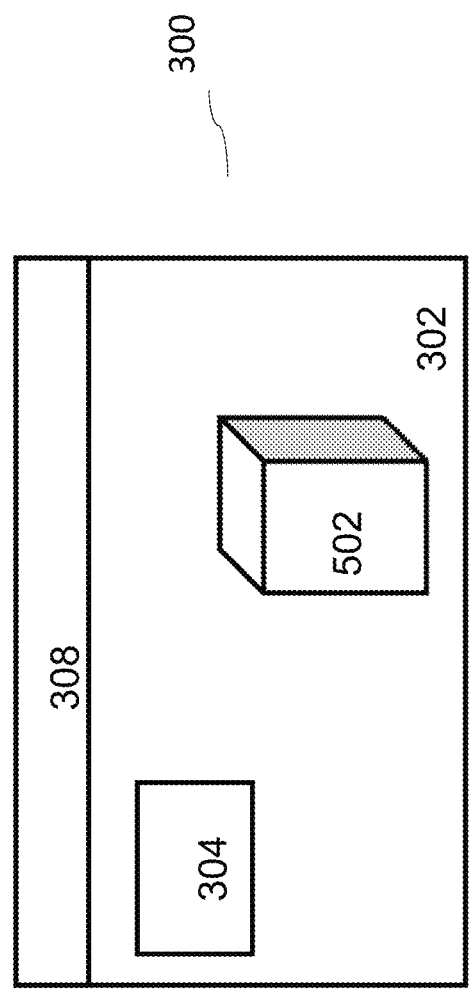
FIG. 5 shows a block diagram of a virtual tour user interface according to one embodiment of the invention.

FIG. 5 shows a block diagram of the user interface 300 with a simplified house 502 rendered in UI element 302. In this Figure, UI element 302 is showing a 3D view of the exterior of house 502. UI element 304 displays a corresponding parcel map including house 502. The viewpoint indicator 306 is also overlaid on the parcel map to indicate the viewpoint displayed in UI element 302.

Figure 6B:
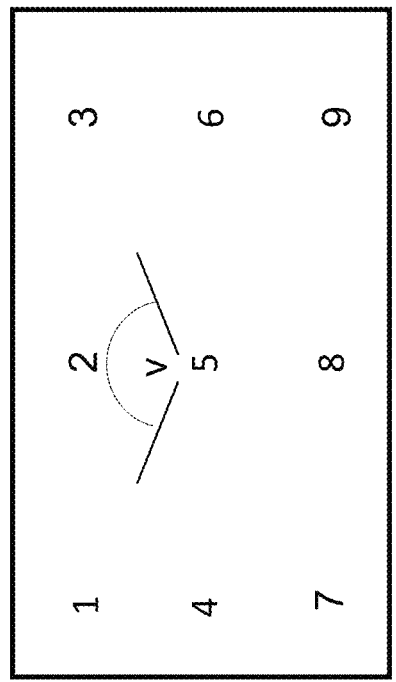
FIGS. 6A and 6B show a block diagram of a virtual tour user interface according to one embodiment of the invention.
Figure 6A:
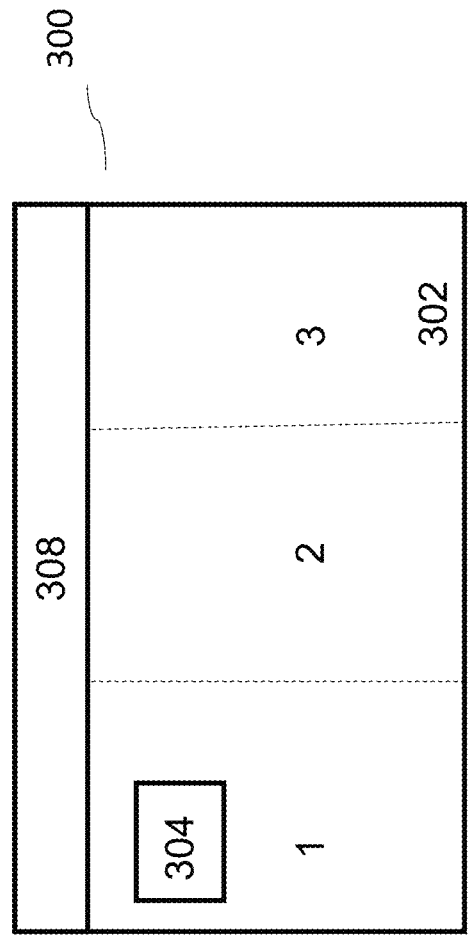

FIGS. 6A and 6B show a block diagram of an exemplary scenario involving navigation within a dense sampling of spherical panoramas. FIG. 6A shows an embodiment of UI 300. FIG. 6B shows an exemplary ground truth image data capture map corresponding to the virtual model in FIG. 6A. Low density sampling is typically used outside of a house. High density sampling is typically used inside the house and generally consists of at least one sample per eighty square feet of floor space. UI element 302 can be used to rotate with two degrees of freedom (2 DOF) inside of a spherical panorama or translate with 2 DOF in the XY plane to adjacent panoramas. In FIG. 6A, user interface element 302 is shown with a 120 degree view (v) from a panorama at position 5 in FIG. 6B. FIG. 4B shows a uniform distribution of captured panoramas at locations 1 through 9. In the embodiment shown of UI element 302 in FIG. 4A, there are 3 adjacent panoramas to which the user can translate based on the field of view (e.g., the field of view points towards panorama capture points 1, 2, and 3, thus defining the translation possibilities for UI element 102 absent a rotation that would encompass other capture points within the field of view).

Clicking within UI element 302 on positions 1, 2, or 3 shown in FIG. 6A, transitions the viewpoint to spatial location of the similarly labeled panorama capture points shown in FIG. 6B. The viewpoint transition may use a number of methods including a fade, directional blending, image flow based warping, or transitions using full 3D information. Other user interfaces are also possible including mapping of 2D screen interactions with the actual 3D model for non-contiguous jumps involving translation and rotation based on the geometry of the model.

Figure 7B:
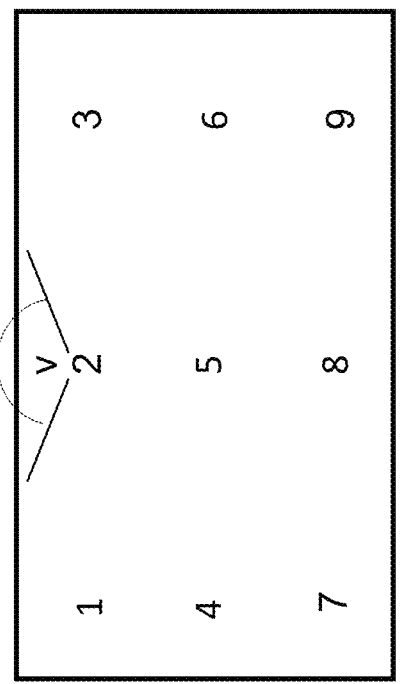
FIGS. 7A and 7B show a block diagram of a virtual tour user interface according to one embodiment of the invention.
Figure 7A:
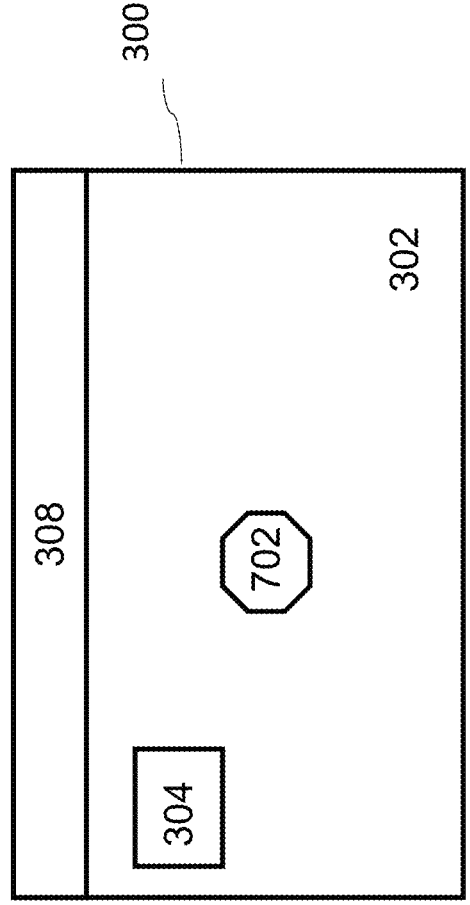

FIGS. 7A and 7B show a block diagram of an exemplary scenario wherein the user interface will not permit the user to translate in the direction of the current viewpoint v. For UI element 302 a connectivity graph may determine if translation between dense spherical panoramas is possible or not. A connectivity graph shows all of the data capture locations on a 2D map of the property. If a transition is possible between two capture points, the connectivity graph will indicate that a transition is available. When the connectivity graph does not enable a translation from a particular viewpoint, UI element 302 may provide feedback that no translation movement is possible. In FIG. 7B, we see a user viewing vector from position 2 on the right. The user is looking at a wall in this position, and no translation movement is possible without first rotating. In FIG. 7A, UI element 302 shows a 'stop sign' 702, indicating that no translation is possible from this viewing vector without rotating first.

FIG. 8 shows a block diagram of User Interface 300 with an enhanced view of UI element 304. User Interface element 304 is a map overlay that identifies an XY position within the virtual model using simplified geometry (such as a floor plan) to show the current viewpoint's relative location in the model—this is a 2-dimensional (2D) view. UI element 304 shows the user's viewpoint and/or position 306 on a map of the model using a dot, beacon, or a directional icon such as an arrow, etc. In addition, UI element 304 also serves as a means to navigate to adjacent or nonadjacent viewpoints or positions. For example, one way to navigate using the 2D map interface is to click on a location on the map—this changes the XY position within the model. When UI element 302 is updated with a new 3D view, the optimal rotation angle for the initial viewpoint direction or viewpoint vector may be preselected by the system. The rotation angle preselection may be based on factors such as presence of further available translation points in the view, computational efficiency, etc. For example, if a corner viewpoint location is selected, the initial viewpoint location may automatically be towards the center of the room rather than towards the corner. In FIG. 8, we see the view of a tax parcel outline 802 and house outline 804. The user's position is shown with a directional icon 806 located on the parcel map, showing a viewpoint looking towards the house.

Figure 9:
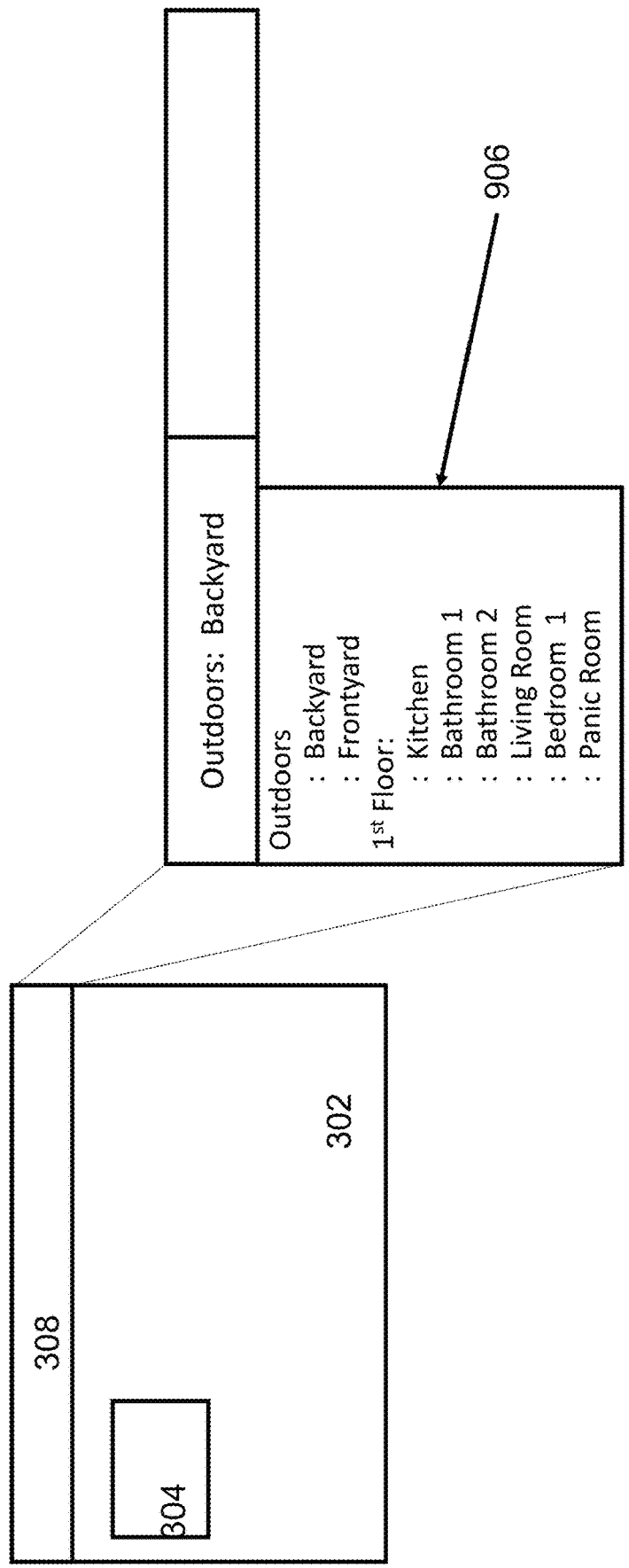
FIG. 9 shows a block diagram of a virtual tour user interface according to one embodiment of the invention.

FIG. 9 shows a block diagram of the user interface 300 with an enhanced view of UI element 308. UI element 308 is a text overlay that broadcasts one or more labels associated with the user's location within the virtual model—this is a 1-dimensional (1D) view —a linear list of locations associated with the virtual model. UI element 308 tells the user where in the virtual model the current viewpoint displayed in UI element 302 is located, preferably based on spatial boundary names or a location-related annotation in the virtual model. UI element 308 may also serve as a means to navigate to non-adjacent locations by incorporating a drop down menu 906. For example, one way to navigate using the 1D interface would be to select a new location using the drop down menu 906. Selecting a new location in drop down menu 906 would change the current viewpoint position within the model based on a predetermined location and viewing vector associated with that label. FIG. 9 shows an embodiment of UI element 308 having a broadcast message 902 indicating that the user is in the 'Outdoors: Backyard'. In addition, this embodiment of UI element 308 has a dropdown element 904 showing different locations that a user can jump to in the virtual model.

UI elements 302, 304, and 308, are interconnected based on the user's viewpoint position within the virtual model, simultaneously broadcasting a 1D, 2D, and 3D view of the position based on position coordinates X, Y, Z, rotation, and pitch. Moreover, UI elements 302, 304, and 308 also serve as a navigation interface, enabling movement to different positions within the model by translation, rotation, or both.

In the next three examples, interaction between the three UI elements 302, 304, and 308 are discussed in the context of remotely touring a real estate environment.

In one example, a user is looking at a viewpoint within the virtual model at a specific XY position with viewing vector rotation R around the Z-axis and pitch U within a bathroom, next to the front door of a residential house. In UI element 302, the users can see exactly what the bathroom looks like, based on an IBR rendering using a combination of image data and geometry. At the same time, the user can see in UI element 304, the map view, that they are in the middle of the bathroom and that a number of different rooms and a hallway are adjacent to their position. Further, UI element 308 indicates that the user's position is Ground Floor: Main Bathroom. To move to an adjacent viewpoint position, the user may select the desired location within UI element 302 and then can further click and hold a mouse button while moving the mouse to rotate their viewpoint within the bathroom in order to get different perspectives of a faucet or shower in the bathroom. As soon as navigation occurs in 3D based on interaction with UI element 302, UI element 304 updates to show a new location on the 2D map of the bathroom based on the translation in 2D. Note that any rotation changes in 3D would not change the position in 2D shown on the map. At the same time, UI element 308 in this case would not change because the user's viewpoint position was still within the same 2D spatial boundary, the Ground Floor: Main Bathroom.

In another example, a user is viewing the virtual model from a specific perspective in the kitchen in UI element 302, seeing the room in 3D, as it would look from that position if they were physically present in the real property. UI element 304 shows the user's 2D viewpoint location 2D position, which is a floor plan in this case. UI element 308 describes the location as being indoors, on the ground floor, and in the kitchen by showing: "First Floor: Kitchen." To move to a new viewpoint position, the user selects within UI element 104, perhaps choosing a new position in the non-adjacent living room with new XY coordinates. Immediately, the 3D view in UI element 302 is updated to the new XY position with a predetermined viewing vector (i.e., predetermined rotation value and viewpoint pitch angle). Because UI element 302 also includes rotation information, the best or ideal viewing vector may be generated automatically for the rotation and pitch values based on a centroid of the density of samples, a connectivity graph, or other calculations involving the geometry of the virtual model. At the same time, UI element 308 also updates indicating that the user is now in First Floor: Living Room.

In another example of the linkage between the main user interface components, a user selects a viewpoint location outside of a residential house, but within the boundary of the legal definition of the real property such as the parcel boundary. UI element 302 shows a 3D view from a specific position and perspective from the backyard, looking towards the exterior of the house. UI element 304 shows a 2D map that includes the tax parcel boundary of the property, an outline of the exterior of the house, and an arrow indicating the user's viewpoint position in the backyard with a viewing vector pointing towards the house outline. UI element 308 broadcasts the users position as Outside: Backyard. To navigating to a new viewpoint location with UI element 308, the user selects a drop down menu in UI element 308, and selects the link Second Floor: Master Bedroom Walk in Closet. Immediately, the user's virtual location jumps to the new position inside the closet of the Master Bedroom, and the 3D view is shown in UI element 302. UI element 304 updates by changing to a new map with a higher resolution (higher resolution due to fewer spherical panoramas captured outside of the house in this instance) showing a second floor floor plan, which is at a different elevation within the house; the user's viewpoint position and 2D direction of the viewing vector are also shown on the map. UI element 308 now broadcasts the previously selected "Second Floor: Master Bedroom Walk in Closet." Note that in this example, the user has changed the Z axis location of the viewpoint within the virtual model, even though only 4 DOF exist in the user interface of UI element 302.

Many parts of the User Interface System work together to create a unique user experience for touring a real estate environment over the Internet—in particular the 3D view rendered in UI element 302 warrants further discussion. In the 3D view of UI element 302, multiple IBR algorithms can be combined to create a user experience that overcomes the inherent tradeoff between photorealism and spatial navigation caused by using just one IBR algorithm exclusively. For example, dense spherical panoramas may be combined with the use of view dependent texture mapping (VDTM) during navigation as the user spatially translates and rotates the viewpoint with the virtual model.

The capture process (defining a spatial boundary, data sampling, and annotation) for an enhanced user experience involves a dense sampling of spherical panorama image data at multiple exposures (e.g., high definition rendering, HDR) and sampling of point cloud geometry from a hybrid camera and laser range scanning device. The processing pipeline (determining data sets, image calibration, image processing, 3D reconstruction (3DR) and scene understanding) operates on the data output from the capture process. Image calibration involves determining panorama pose and adding depth to each pixel of the panorama. Image processing creates HDR spherical panoramas from input images. 3D reconstruction involves removing noise from point clouds, reconstructing a real estate environment's geometry to varying degrees of approximation, generating geometric proxies that describe the environment with simpler meta primitives, feature matching between spherical panoramas, positioning of spherical panorama data in 3D space, feature matching between the panorama and 3D space, and compute view dependent texture maps for the geometry and/or geometric proxies.

Rendering displays the processed data to an end-user via an IO device. During rendering, the user's position and navigation influence which elements of geometry and image data are combined for a given Image-Based Rendering algorithm at any possible location in or around the virtual model. Ground truth image data is the captured image associated with a particular capture location, and optionally may include any metadata associated with the captured image, such as GPS coordinates, IR point clouds, etc. Ground truth data may also include labels (outside: backyard, or groundfloor: bathroom) which are ground truth in the sense that they are directly collected at the scene and are not synthetic approximations. For example, when a user is near a position where ground truth image data is captured, very little geometry is required to render the most photorealistic view of the model. At the exact position of capture, the use of an image primitive is the most photorealistic view possible. Composited image primitives such as a spherical panorama enable 2 DOF rotational navigation. When translating directly between two spherical panorama locations, other algorithms such as optical flow may provide more photorealistic warping during the rendering of predetermined translational pathways defined in the connectivity graph.

When translating between other locations within the virtual model, the use of VDTM over explicit geometric proxies combined with depth and feature matching between nearby panoramas during rendering provides a decrease in photorealism but enables fluid movement to any spatial location. In contrast to traditional texture maps, VDTMs compute new textures for different spatial positions, dynamically changing these as the user's spatial position changes. This dramatically reduces artifacts associated with appearance of objects.

In various embodiments, rendering may use RGB spherical panoramas, point clouds, geometric proxies, view dependent texture mapping, and feature matching between the spherical panoramas and geometric proxies to create a fluid user experience involving multiple IBR algorithms that dynamically change based on the user's location, direction, and speed of movement within the model. A user can view ground truth image data or navigate to any other synthetic viewpoint in the same user interface, enjoying both photorealism and spatial navigation.

Figure 10:
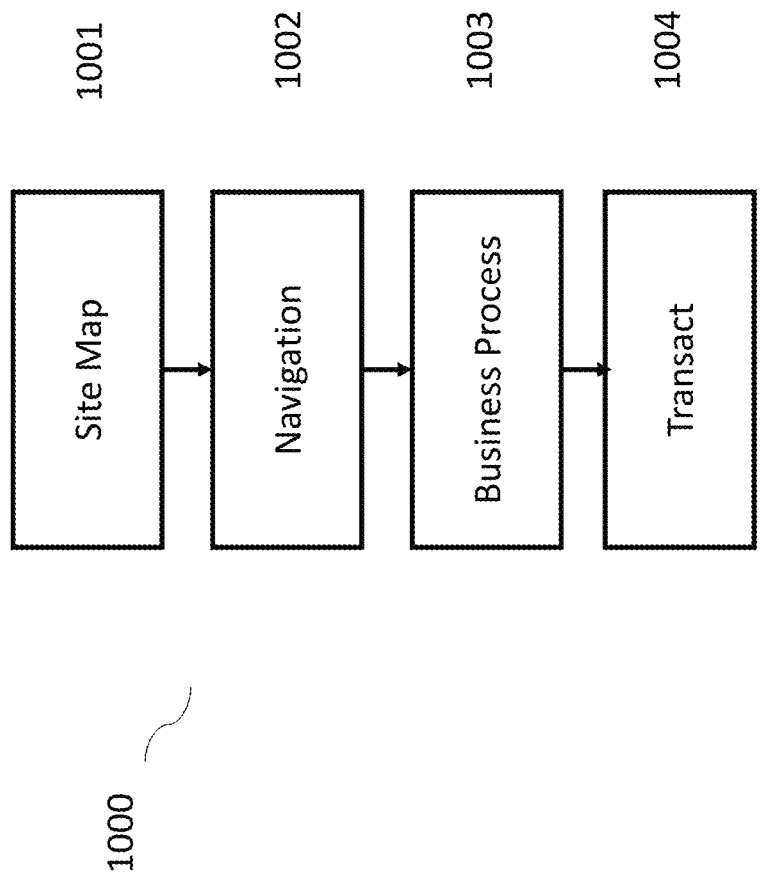
FIG. 10 shows a block diagram of a transaction flowchart suitable for use with the disclosed inventions.

FIG. 10 shows a transaction pipeline associated with use of the User Interface System. The transaction pipeline 1000 ties together the use of IBR models of real property with specific transactions in different business scenarios. Business scenarios may involve selling, buying, renting, leasing, or booking real estate such as houses, apartments, offices, or hotels—all associated with real estate environments. IBR technology is ideally suited to commercial use for marketing in these scenarios, because models are created with little or no manual work (excluding capture related tasks). Moreover, IBR approaches focus on rendering a photorealistic view of a real scene—exactly what is needed in real estate marketing to serve as a proxy for physically touring an environment.

A Site Map 1001 describes a website that is used to facilitate transactions, market real estate, and render models of real estate environments which can be spatially navigated. Once on the website, the users may select to Navigate 1002 an online model of a real estate environment. After interaction with the model, a user may initiate a number of different business processes 1003 depending on the scenario, including but not limited to scenarios involving:

Residential real estate: ask a question, list a property, talk to an agent, schedule an in person tour, make an offer to buy, make an offer to buy contingent upon a traditional in-person home tour, or other tasks necessary to coordinate and close residential transactions;

Commercial real estate: schedule an in person tour, make an offer to buy, make an offer to lease, make an offer to lease or buy contingent upon an in-person tour, or other tasks necessary to coordinate and close commercial transactions;

Real estate for rent: schedule an in person tour, make an offer to rent, make an offer to rent contingent upon an in-person tour, or other tasks necessary to coordinate and close rental transactions; or Hotels: book a hotel room or other tasks necessary to coordinate and close hotel transactions.

Once a business process 1003 has been initiated the Transaction component 804 supports various processes with workflow automation software, web page screens, and mobile and tablet software that can be used over the Internet and hosted by the System. This workflow automation software may streamline transactional details associated with one or more of selling, buying, leasing, renting, and booking transactions for real estate environments. In the case of residential real estate, these workflow tools may include:

A secure, real-time messaging platform between all parties to the transaction: buyer, seller, listing agent, buyer's agent, lender, title agent, escrow agent, appraiser, home inspector, and others etc. Collaborative features such as inviting other parties who are not immediately connected to the transaction are enabled as well, such as sending a real estate listing to a friend or asking an extended family member to provide feedback on a house under consideration;

A timeline and contingency date tracking platform to ensure that transaction details are executed and match the agreed upon contract;

A document tracking platform that unifies secure storage of all documents related to the transaction;

A term sheet platform that provides a simplified offer negotiation process where parties can agree to contract terms prior to drafting and signing a complete and binding contract; or An online negotiation platform that provides a collaborative environment where a buyer and a seller can negotiate a term sheet or contract in real-time without having to exchange copies of a contract.

In various embodiments of the transaction component 1004, electronic signatures may be used to enable a paperless transaction.

Transaction component 1004 may include support for alternative transaction types such as auctions, option contracts, lease to own, complicated contingencies, or making offers on off market properties that are not currently listed.

In one example of a Transaction 1000, a potential home buyer is searching for homes using MLS data on a real estate brokerage website. Upon finding a home that meets their search criteria, the potential buyer reviews relevant information contained in the listing including a link to a virtual tour. Next, the potential buyer clicks on the virtual tour link, loading up a specific model associated with the listing. Navigating 802 through an online model, the buyer completes a remote home tour. The business processes 803 are all focused on residential real estate sales, and the buyer can initiate a transaction 804 by contacting the listing agent about the house through the system's messaging interface. The potential buyer can also invite their spouse, relatives, buyer's agent, etc., to take the online tour as well by sending them a link to the model. The potential buyer may submit an offer to buy the property via the system's messaging interface. The homeowner and listing agent would receive a notice of the offer via the term sheet system and the homeowner could accept the offer via the messaging interface. Various embodiments of the transactional system 804 may include messaging, calendaring, document tracking, electronic signatures, and workflows across all parties necessary to complete closing. For example, when coordinating a home inspection contingency, the transactional system 1004 would coordinate a mutually agreeable date and time between the buyer, seller, buyer's agent and home inspector. Following inspection, the home inspector would upload the inspection report into the transactional system 804 which the buyer would review and then continue to move forward with the closing process. Other contingencies and parties are similarly coordinated.

In another example of a transaction 1004, a visitor arrives on the website 1001 and uses the UI 300 to navigate 1002 through an IBR model of a real property. Impressed with the technology and value proposition to improve the availability of home tours over the Internet while simultaneously reducing the number of inconvenient visits from buyers, the visitor initiates the process 1003 to list a home for sale, accessing workflow software relevant to the transaction 1004. Once completed, the data capture process is initiated to capture data necessary for creating a virtual tour of the home, as well as other relevant downstream processes associated with the system necessary to market and sell the home.

In another example of a transaction process 1004, a potential home seller could follow the listing process to activate an auction-style listing of their home where they could choose between multiple auction types including an English, Dutch, sealed bid, or other approach. This creates a predetermined auction-style business process 1003 which will define how potential buyers interact with the real estate listing. After creation of a model, potential buyers can navigate the property via a virtual 3D tour and review any information included in the auction. The potential buyer may decide to submit a bid via the auction-style transaction process 804, which initiates a series of closing related tasks for various parties.

In another example of a transaction process 1000, a potential home seller could follow the traditional real estate listing process but also enable potential buyers to purchase a call option on the house by setting up a call option business process 1003. A party interested in the home could navigate 1005 through the property online and then initiate an option agreement, paying an option fee to reserve a predetermined purchase price in the future. The owner and buyer would collaborate on a term sheet prior to finalizing the document signatures and any other transactional 1004 details would be coordinated to close the deal.

Figure 11:
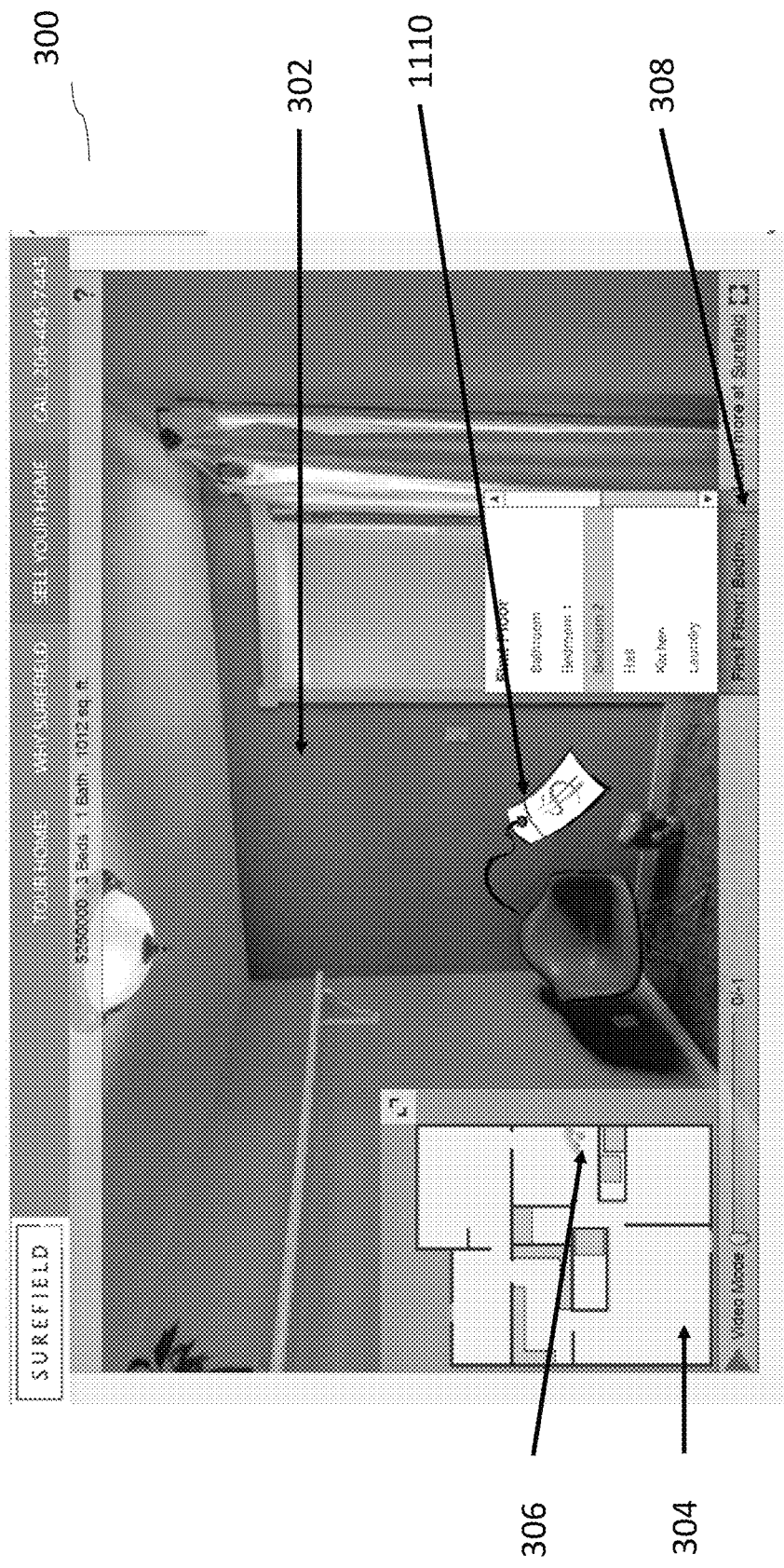
FIG. 11 shows a virtual tour user interface according to one embodiment of the invention.

FIG. 11 shows an embodiment of the user interface 300 with an enhanced transaction capability. In the embodiment shown, items such as furniture and appliances that are viewable via UI element 302 during a virtual tour may be associated with a transaction tag 1110 that indicates the item may be commercially available for the viewer to purchase. Although the transaction tag 1110 shown in FIG. 11 is perceptible by the viewer, transaction tags in some embodiments may be imperceptible by the user, such as annotations and metadata added during the data capture process. Other embodiments may not rely on transaction tags, instead relying on on-demand identification methods such as object, image, text, and trademark recognition techniques to identify items shown in UI element 302.

FIG. 12 shows a block diagram of an embodiment of an on-demand method of providing information about items in a virtual tour, including merchant information and advertisements via the user interface 100. For example, a potential home buyer may visit a real estate web site and take a virtual tour of a property listed for sale on the web site. During the 3D tour of the home, user interface element 302 enables the viewer to select objects seen in the virtual tour and receive information about the objects. The information received can include the identity of local stores at which the object can be purchased, manufacturer of the object, etc.

In step 1202, the user selects an object that he sees in the virtual tour. For example, while touring the kitchen, the user may select the stove in step 1202. The on-demand system will retrieve the 3D image of the selected object from the virtual tour in step 1204 and search the 3D image for text and trademark images. After the object's 3D image and any associated text and trademarks have been identified, the system constructs a search query 1206 using object image data, extracted text, and extracted trademarks. In step 1208, the search query is sent to a search engine which searches an object 3D image database to identify the type of object (e.g., a cooking range) in step 1210. Location data may also be used to help identify the type of an object. For example, a rectangular box-shaped object in the kitchen is more likely to be a cooking range than a rectangular box-shaped object in the laundry room, which is more likely to be a washer or dryer. The brand (e.g., manufacturer) of the object may be determined by searching the object image for identifying physical characteristics and searching a text and trademark image database in step 1212. In step 1214, the results of the object identification in step 1210 and the brand identification in step 1212 are aggregated to identify the object and its manufacturer. After the object has been identified, a database of local merchants is searched in step 1216 to identify nearby stores that sell the object. In an alternative embodiment, the inventory of internet-based merchants may be searched to identify websites from which the object may be purchased. In step 1218, the identifying information about the object is presented to the user, along with information about merchants from whom the object may be purchased. In an alternative embodiment, an advertising engine (not shown) may provide an advertising placement opportunity for sale to merchants who sell the product or competing products, thus allowing the system to provide highly relevant advertisements that correctly identify the product the viewer/consumer wishes to purchase.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the embodiments described herein. These and other changes can be made to the invention in light of the detailed description.

These and other changes can be made to the invention in light of the above detailed description. In general, the terms used in the following claims should not be construed to be limited to the specific embodiments disclosed in the specification, unless the above detailed description explicitly defines such terms. Accordingly, the actual scope of the invention encompasses the disclosed embodiments and all equivalent ways of practicing or implementing the invention under the claims.

In view of the many possible embodiments to which the principles of this invention may be applied, it should be recognized that the detailed embodiments are illustrative only and should not be taken as limiting the scope of the invention. Thus, we claim as our invention all such embodiments as may come within the scope and spirit of the following claims and equivalents thereto.

The invention claimed is:

1. A computer-readable memory medium containing program commands for controlling a computer processor, when executed in a computer system, to facilitate a virtual tour of a real property using image-based rendering, by performing a method comprising:
    defining a plurality of spatial boundaries of a plurality of spaces of a selected real property, each spatial boundary delineating a volume of one or more of the plurality of spaces of the selected real property, at least one of the plurality of spatial boundaries identifying an area of the selected real property, and at least one of the plurality of spatial boundaries defining a space located within the identified area of the selected real property;
    identifying a plurality of objects within one or more of the plurality of spatial boundaries;
    causing the computer system to render and display a virtual model of the selected real property from a 3D viewpoint in the selected real property, the virtual model comprising a plurality of views of one or more of the plurality of spaces of the selected real property and geometric information, each of the plurality of views comprising images, panoramas, or synthesized views and associated with a corresponding spatial boundary indicative of a capture location within the selected real property;
    receiving via a user interface a selection indicating an object located in the selected real property and rendered in the virtual model, the indicated object being displayed in one or more of the plurality of views;
    automatically recognizing and identifying the indicated object using the one or more of the plurality of views displaying the indicated object and according to the spatial boundaries corresponding to the one or more of the plurality of views displaying the indicated object, including identifying an image of the indicated object in the one or more views based upon the identified plurality of objects within the one or more of the plurality of spatial boundaries; and
    causing the computer system to present information associated with the automatically identified object via the user interface.

2. The memory medium of claim 1, the method further comprising:
    determining additional information corresponding to the indicated object and at least one of the spatial boundaries corresponding to the one or more of the plurality of views displaying the indicated object, the additional information comprising one or more of the type of object, an advertisement advertising the object, or a link to a webpage.

3. The memory medium of claim 1, the method further comprising:
    determining additional information corresponding to the indicated object and at least one of the spatial boundaries corresponding to the one or more of the plurality of views displaying the indicated object, the additional information comprising one or more of product information, merchant information, or advertising information; and
    causing the computer system to display the corresponding additional information in conjunction with the displayed indicated object to facilitate a transaction associated with the indicated object.

4. The memory medium of claim 3 wherein the facilitated transaction is a purchase of the indicated item.

5. The memory medium of claim 3 wherein determining the additional information further comprises determining the additional information using the indicated object and an advertising database, a merchant inventory, or both.

6. The memory medium of claim 3 wherein the determining the additional information further comprises determining the information using the indicated object and an advertising engine.

7. The memory medium of claim 1 wherein the automatically identifying an indicated object using the one or more of the plurality of views displaying the indicated object and according to the spatial boundaries corresponding to the one or more of the plurality of views displaying the indicated object further comprises:

using metadata or an annotation associated with a spatial boundary corresponding to the one or more of the plurality of views displaying the indicated object to determine the indicated object.

8. The memory medium of claim 1 wherein the automatically identifying an indicated object further comprises:

searching an object image database for one or more objects that match the identified image of the displayed indicated object and using the matching objects to identify the indicated object.

9. The memory medium of claim 8 wherein the automatically identifying an indicated object further comprises:

extracting trademark image data or text from the identified image of the displayed indicated object or the matching objects; and searching a trademark image database or a trademark text database to identify the indicated object.

10. The memory medium of claim 1 wherein the automatically identifying an indicated object using the one or more of the plurality of views displaying the indicated object and according to the spatial boundaries corresponding to the one or more of the plurality of views displaying the indicated object further comprises:

using the defined spatial boundaries corresponding to the one or more of the plurality of views displaying the indicated object, identifying a current space of the plurality of spaces of a selected real property that includes a capture location corresponding to at least one of the views displaying the indicated object; and identifying the object according to the identified current space.

11. The memory medium of claim 1 wherein the automatically identified indicated object is a class of object.

12. The memory medium of claim 11 wherein the automatically identified indicated object is a type of object within the class of object.

13. The memory medium of claim 12 wherein the identified automatically indicated object corresponds to a particular manufacturer.

14. The memory medium of claim 1, the method further comprising:

causing the computer system to display a product tag or label corresponding to the indicated object being displayed in the one or more views; and identifying the indicated object using the corresponding product tag or label.

15. The memory medium of claim 1 wherein the identifying a plurality of objects within one or more of the plurality of spatial boundaries further comprises:

registering in the virtual model each of the plurality of objects within one or more of the plurality of spatial boundaries.

16. The memory medium of claim 1 wherein the identified area of the selected property is a parcel outline of the selected real property.

17. A computer-implemented method for facilitate a virtual tour of a real property using image-based rendering, comprising:

receiving via a user interface a first selection indicating a selected real property to virtually tour, the selected real property being one of a plurality of real properties associated with information stored in one or more databases;

receiving via the user interface a second selection requesting initiation of a virtual real estate tour of the selected real property;

defining a plurality of spatial boundaries of a plurality of spaces of the selected real property, each spatial boundary delineating a volume of one or more of the plurality of spaces of the selected real property, at least one of the plurality of spatial boundaries identifying an area of the selected real property, and at least one of the plurality of spatial boundaries defining a space located within the identified area of the selected property;

identifying a plurality of objects within one or more of the plurality of spatial boundaries;

causing the computer system to render and display a virtual model of the selected real property from a 3D viewpoint in the selected real property, the virtual model comprising a plurality of views of one or more of the plurality of spaces of the selected real property and geometric information, each view comprising an image, a panorama, or a synthesized view and associated with a corresponding spatial boundary indicative of a capture location within the selected real property;

receiving via a user interface a third selection indicating an object located in the selected real property and rendered in the virtual model, the indicated object being displayed in one or more of the plurality of views;

automatically recognizing and identifying the indicated object using the one or more of the plurality of views displaying the indicated object and according to the spatial boundaries corresponding to the one or more of the plurality of views displaying the indicated object, including identifying an image of the indicated object in the one or more views based upon the identified plurality of objects within the one or more of the plurality of spatial boundaries;

determining additional information corresponding to the indicated object and at least one of the spatial boundaries corresponding to the one or more of the plurality of views displaying the indicated object, the additional information retrieved from the one or more databases and comprising one or more of product information, merchant information, or advertising information; and causing the computer system to display the corresponding additional information in conjunction with the displayed indicated object to facilitate a transaction associated with the indicated object.

18. The method of claim 17 wherein the transaction is a purchase of the indicated object.

19. The method of claim 17 wherein the 3D viewpoint has two degrees of freedom.

20. The method of claim 17 wherein at least one of the spatial boundaries corresponds to an indoor area, an outdoor area, a floor, or a room of the property.

21. The method of claim 17 wherein the causing the computer system to render and display a virtual model of the selected real property from a 3D viewpoint in the selected real property, further comprises:

causing the computer system to render and display a virtual model of the selected real property from a 3D viewpoint in the selected real property from a plurality of captured images of one or more of the plurality of spaces of the selected real property and a generated 3D point cloud.

22. The method of claim 17 wherein the automatically recognizing and identifying an indicated object further comprises:

identifying an image of the indicated object in the one or more views; and searching for the identified image in a database of object images to match the identified image to at least one matching object; and using the at least one matching object to identify the indicated object.

23. The method of claim 17 wherein the user interface is implemented by a webpage.

* * * * *